Oct. 2, 1951     M. FUNKHOUSER ET AL     2,569,520
FLOW CONTROL MECHANISM FOR SHOCK ABSORBERS
Filed Dec. 4, 1945
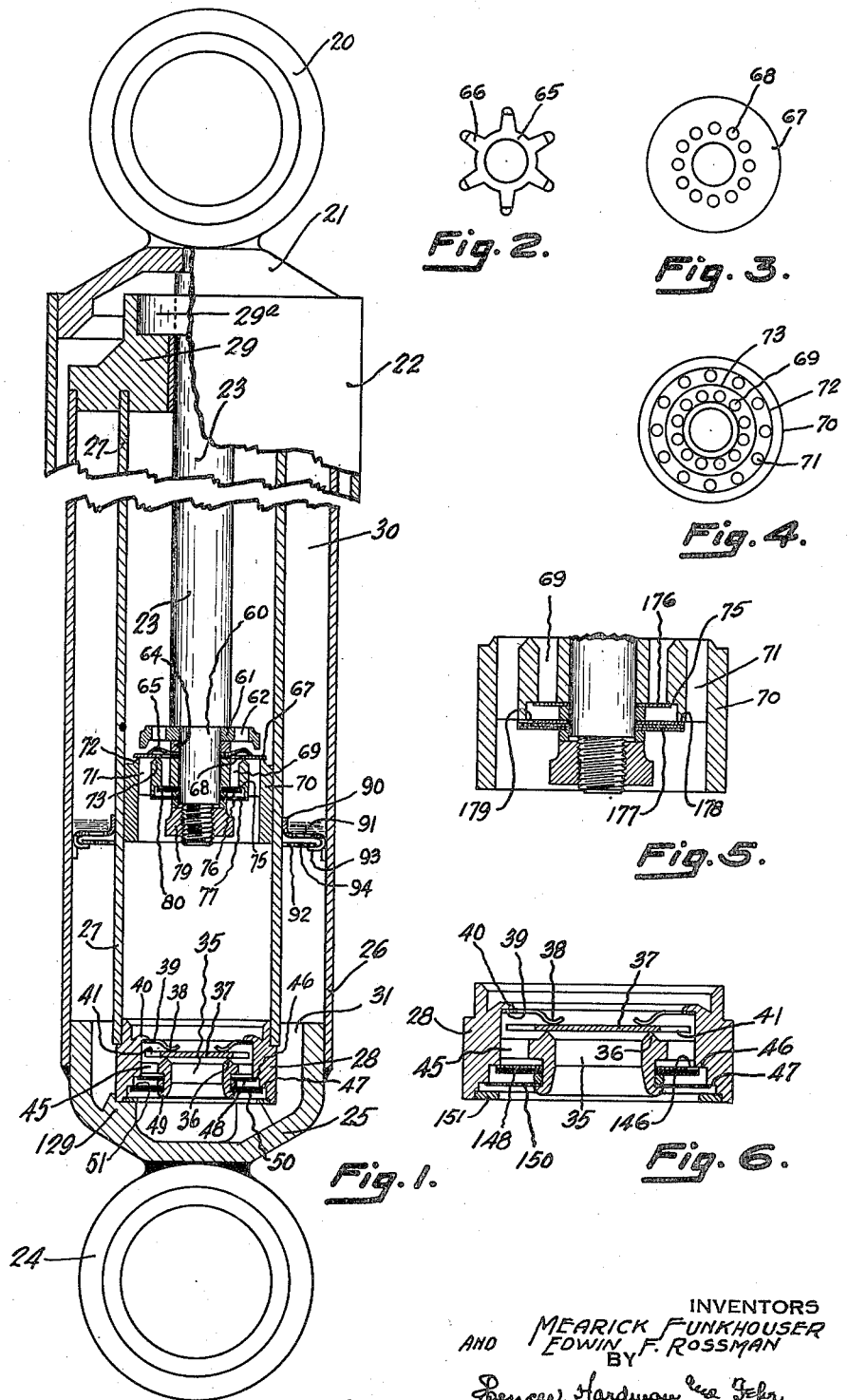
INVENTORS
MEARICK FUNKHOUSER
AND EDWIN F. ROSSMAN
BY Spencer, Hardman &co Fehr
THEIR ATTORNEYS Patented Oct. 2, 1951

2,569,520

UNITED STATES PATENT OFFICE 2,569,520

FLOW CONTROL MECHANISM FOR SHOCK ABSORBERS

Mearick Funkhouser and Edwin F. Rossman, Dayton, Ohio, assignors to General Motors Corporation, Detroit, Mich., a corporation of Delaware Application December 4, 1945, Serial No. 632,665

6 Claims. (Cl. 277—45)

1

This invention relates to improvements in flow control mechanisms for hydraulic shock absorbers.

It is among the objects of the present invention to provide a flow control mechanism for a hydraulic shock absorber of simple structure and design, capable of controlling the approaching and separating movements of two relatively movable members between which the shock absorber is connected.

Another object of the present invention is to provide a hydraulic shock absorber with fluid flow control mechanism which operates silently and offers a smoother control of fluid flow whereby a steadier shock absorber action is attained.

Further objects and advantages of the present invention will be apparent from the following description, reference being had to the accompanying drawings, wherein a preferred embodiment of the present invention is clearly shown.

In the drawings:

Fig. 1 is a part, longitudinal section of a shock absorber equipped with the present invention.

Fig. 2 is a view of the piston valve spring.

Fig. 3 is a view of the piston valve.

Fig. 4 is a plan view of the piston.

Fig. 5 is a section of the piston equipped with a modified form of fluid flow control.

Fig. 6 is a view of the valve cage, in section, having a modified form of fluid flow control.

Referring to the drawings, the numeral 20 designates a mounting ring at one end of the shock absorber by means of which the shock absorber may be attached to one of the relatively movable members, whose movement the shock absorber is to control. In the ordinary installation this member would be the frame of a vehicle. Ring 20 is secured to a head member 21 to which the dust covered shield in the form of a tube 22 is secured in any suitable manner. The piston rod 23 has its one end also secured to the head member 21 so that it will move with said member. The mounting ring 24 is attachable to the other relatively movable member, in the ordinary installation the axle of the vehicle. This ring has the cup shape element 25 secured thereto in any suitable manner. A tubular member 26 telescopically receives the cup shape member 25 and is secured thereto by welding or any other suitable manner. The opposite end of the tubes 26 and 27 are secured to a head member 29. This head member 29 provides a bearing through which the piston rod 23 may slidably move. A suitable packing gland 29a is provided in the head 21 to prevent leaks past the piston rod.

2

The tubular member 27 is the working cylinder of the shock absorber. The lower end of the cylinder tube 27 has a valve cage 28 secured thereto, said valve cage resting upon lugs 129 in the cupped shape end member 25. Tubes 26 and 27 are held concentric so as to form an annular space 30 therebetween, which is termed the "fluid reservoir." This fluid reservoir communicates with the bottom of the valve cage 28 through the annular space 31 provided between the valve cage and the cupped shape end member 25.

As shown in the Figures 1 and 6, the valve cage 28 has a plurality of fluid flow passages providing communication between the interior of the cylinder 27 and the passage 31 leading to the reservoir 30. One of these passages, numbered 35, is central of the valve cage. An annular valve seat 36 surrounds the central opening 35 on the cylinder side of the valve cage. A disc valve 37 is urged upon the valve seat 36 by spring fingers 38 formed in a ring 39, secured in the valve cage 28 by the spinning over of an edge 40. The valve 37 has notches 41 provided in its peripheral edge to permit fluid passage around and past valve 37 under certain circumstances.

Valve cage 28 has a plurality of fluid passages 45 arranged in a circular row around the central opening 35. Two inner annular shoulders 46 and 47 spaced from each other axially of the valve cage, form valve seats which encircle the group of fluid flow passages 45. A spring disc valve is yieldably urged into engagement with each annular shoulder 46 and 47 respectively. In Fig. 1, the valve 48 which engages the valve seat shoulder 46, is a single, ring-shaped disc, the center of which is secured to the valve cage, the outer peripheral portion of valve 48 engaging and seating upon the shoulder 46. The valve 50 engaging the shoulder 47, has two or more ring-shaped spring discs centrally secured to the valve cage and spaced from the disc valve 48. A portion 49 of the valve cage is spun over against the adjacent valve and thus both valves 48 and 50 are flexed so that their edges are urged upon their respective valve seats 46 and 47 at a predetermined pressure. Valve 50 having multiple discs, is urged upon its seat at a heavier spring pressure than valve 48. The one disc of the valve 50 which directly engages the shoulder 47, has a notch 51 provided in its peripheral edge which forms a constantly open orifice between valve 50 and its seat 47.

The piston rod 23, which has one end secured to the head 21 and slidably extends through a bearing provided in the head 29, has the shock absorbed piston secured at its other end. This end of the piston rod 23 is reduced in diameter as at 60. A buffer plate 61 having a plurality of openings 62, is mounted upon the reduced end 60 of the rod 23 and abuts against the shoulder formed between two different diameter portions of the rod. A spacer collar 64 abuts against the buffer collar 61 and then a valve spring 65 is placed on the portion 60 of the piston rod against the spacer collar 64. Fig. 2 illustrates this valve spring 65 having a plurality of outwardly extending spring fingers 66 which engage and reinforce a resilient disc-valve 67 also centrally secured on the portion 60 of the rod. This valve is illustrated by the Fig. 3 and is shown having a plurality of openings 68 arranged in a circular row, said openings aligning and coinciding with fluid flow passages 69 formed in the body of the piston 70. Other fluid flow passages 71, arranged in a circular row about the passages 69, are provided in the piston. An annular valve seat 72 encircles the fluid flow passages 71 in the piston and another annular valve seat 73 encircles the fluid flow passages 69 of the piston. Both valve seats 72 and 73 are normally engaged by the normally flexed resilient valve 67 also urged upon said valve seats by the additional pressure of spring 65. A counter-bore in the piston provides a shoulder 75 which forms a valve seat encircling the passages 69. The outer end of the piston forms another valve seat on the piston. A resilient, multiple disc valve 76, mounted centrally on the piston portion 60, is normally flexed to engage the valve seat 75 for purposes of controlling fluid flow through the passages 69. Another resilient disc valve 77 is centrally mounted upon the rod portion 60 with a separator between the disc valve 76 and valve 77. This valve 77 is normally flexed to engage the outer end of the piston which forms the seat for said valve. A nut 79 threaded to the end of the piston rod, urges a pressure ring upon the disc valve 77 whereby this valve 77 as well as the valve 76 is flexed and urged upon the respective seats provided by the piston. It will be seen that valve 76 comprises multiple discs and, therefore, is stiffer and more heavily urged upon its seat than the valve 77. The inner disc of valve 76 or more specifically the disc of valve 76 which directly engages the valve seat 75, has a notch or groove 80 provided at its peripheral edge, forming a constantly open fluid flow orifice in this valve.

In the reservoir 30, there is provided a baffle ring 90 which forms a partition in the annular space or reservoir and is slightly beneath the lowest level of the fluid in said reservoir. This partition has a series of comparatively large openings 91. A valve 92 is loosely carried by inwardly extending fingers 93 on the partition so as normally to be spaced from the main body of the partition. Valve 92 has a plurality of slits or small fluid flow restricting openings 94 coinciding with the larger openings 91 in the partition. The fluid may pass more freely through the partition when the valve is in its normal position. However if the valve 92 is moved into engagement with the main body of the partition by upward movement of fluid in the reservoir, then fluid flow through the partition is restricted by the slits or small openings 94 of the valve then coinciding with the openings 91, which will reduce the fluid flow capacity thereof.

The shock absorber just described operates in the following manner. In response to movements of the relatively movable members between which the shock absorber is connected in the standard installation of a vehicle, the piston will be moved downwardly in the cylinder toward the valve cage 28. Pressure exerted upon the fluid in the lower chamber of the cylinder will cause the fluid to pass through the passages 71 in the piston, into the cylinder chamber above the piston, by lifting the valve 67 from engagement of the valve seats 72 and 73. Due to the presence of the piston rod 23 in this upper chamber of the cylinder all the fluid displaced by the piston from the lower chamber of the cylinder cannot be received by this upper chamber, therefore, a certain portion of the fluid in the lower cylinder chamber will be urged through the passages 45 in the valve cage 28. At a certain pressure, valve 48 will be urged from its seat to establish a fluid flow into the space between valves 48 and 50. The first flow from said space will be through the constantly open fluid flow orifice 51 in the one disc of the multiple disc valve 50. However when the existing fluid pressure cannot properly be relieved by this fluid flow orifice 51, then valve 50 is moved from its seat 47 to establish a flow compensating for the excessive pressure. The restriction to fluid flow from the chamber in the cylinder beneath the piston will cause the shock absorber to offer a resistance to the approaching movement of the two relatively movable members.

When the two relatively movable members move to separate, a reverse action of these shock absorbers is obtained. Now the piston is moved upwardly in the cylinder and pressure upon the fluid in the upper cylinder chamber will urge the fluid through the openings 62 in the supporting plate 61, through openings 68 in valve 67, fluid flow passages 69 in the piston and through the open fluid orifice 80 in the valve 76. After this, valve 77 is moved from its seat on the piston and thus a restricted fluid flow is established through the piston. If the pressure cannot properly be relieved by the fluid flow through orifice 80, then the excessive pressure will move the valve 76 from engagement with its valve seat 75 to compensate for this excess in fluid pressure. Due to the presence of the piston rod in the engine cylinder chamber, fluid discharged therefrom into the lower cylinder chamber is insufficient completely to fill said lower chamber, and so it is necessary to take in fluid from the reservoir as the piston moves upwardly in the cylinder, thereby compensating for piston rod displacement. To accomplish this, valve 37 is lifted from its seat 36 and a comparatively free flow of fluid from the reservoir 30 through the passages 31 and 35 into the cylinder is established.

In Fig. 6, a modified form of valve mechanism is shown. In Fig. 1, the shoulder 47 of the valve cage is engaged by a single valve-disc while the heavier loaded, multiple disc-valve engages the valve seat 47. In Fig. 6 this arrangement is reversed. Here the shoulder 46 is engaged by a multiple disc-valve, the inner disc of which, directly engaging the valve-seat, having the orifice 146 provided therein. Thus the initial flow is established through the orifice, past the valve 148 and into the space between it and the valve 150 and as soon as the pressure is sufficient in this space, valve 150 will be moved from its seat to complete and restrict the fluid flow. When excessive pressure cannot properly be relieved by the fluid flow orifice 46, then the valve 148 is flexed and moved from its seat to compensate for such excessive pressures, the valve 150 flexing accordingly.

The valve cage may also be provided with a baffle ring 151 forming an inwardly extending annular flange or shelf adjacent the exhaust area of the disc valve 150, but spaced therefrom so that during movement of the valve from its seat or ledge 47, said valve will not engage the ring. The presence of this annular flange 151 or shelf provides an impedance upon which the fluid discharged past valve 150 impinges whereby hissing noises are dampened and substantially eliminated.

In Fig. 5 a modified form of piston valve construction is shown. Here instead of having the heavier multiple disc-valve engage the inner valve seat 75, only a single valve disc 176 engages said seat while a multiple or heavier disc valve 177 is provided to engage the valve seat 178. The inner disc of valve 177 directly engaging the valve seat 178, has an orifice 179 which in this instance does not become effective until fluid pressure has moved the valve 176 from its seat. If the two valves 176 and 177 acting in series and especially the orifice 179 of valve 177 are not sufficient properly to relieve the fluid pressure, then the excessive pressures will move valve 177 from its seat to compensate therefor.

From the aforegoing it will be seen that the valve construction provided in the present instance forms a control for more smoothly restricting fluid flow through the shock absorber and thereby providing a steadier shock absorber action. The construction also reduces the usual noises accompanying spring loaded valves actuated by fluid pressure from their seats to establish pressure relieving flows.

While the embodiment of the present invention as herein disclosed, constitutes a preferred form, it is to be understood that other forms might be adopted, all coming within the scope of the claims which follow.

What is claimed is as follows:

1. A fluid flow control mechanism operative to control the transfer of fluid from one chamber into another, said mechanism consisting of a valve-cage having axially spaced, annular ledges of different diameters surrounding fluid passages in said valve-cage; successively acting means operative in series to establish controlled fluid flows through said passages in one direction, said means consisting of flexible disc valves held in spaced relation by a collar, each normally biased to engage a respective ledge; and retaining means pressed upon the central area of one of said flexible disc valves for equally biasing both valves to engage their respective ledges.

2. A fluid flow control mechanism operative to control the transfer of fluid from one chamber to another, said mechanism consisting of a valve-cage having axially spaced, annular ledges of different diameters surrounding fluid passages in said valve-cage; successively acting means operative in series to establish controlled fluid flows through said passages in one direction, said means consisting of flexible disc valves, each normally biased to engage a respective ledge; retaining means exerting a biasing force on the central area of both said valves; and a baffle ring secured to the valve cage in spaced relation to the disc valve acting finally to establish a fluid flow through the passages, the unsecured edge of the baffle ring extending over and beyond the free peripheral edge of the adjacent valve and spaced therefrom so that said baffle ring is not engaged by the adjacent valve when flexed to establish a fluid flow.

3. A fluid flow control mechanism consisting of a valve-cage having a plurality of passages opening into an annular recess in one end surface of said valve-cage; three annular ledges of different diameters in the peripheral wall of said recess; successively acting, flexible disc valves biased to engage and seat upon the two inner ledges respectively; and a baffle ring secured to the outer ledge, the unsecured edge of said ring overlapping the free edge of the valve engaging the intermediate ledge and spaced therefrom so as not to be engaged thereby when said valve is flexed to establish a fluid flow.

4. A fluid flow control mechanism consisting of a valve-cage having a hollow core and a plurality of passages about said hollow core and opening into an annular recess in one end surface of said valve-cage; a valve engaging the core and operative to permit fluid to flow therethrough in one direction only; an annular inner shoulder in the recess; a valve centrally secured about the hollow core of the valve cage and normally biased to urge its outer peripheral portion into seating engagement with said annular shoulder said valve being operative to permit fluid flow through said passages in the other direction only; and a fluid flow baffle ring having its outer peripheral edge portion secured to the valve-cage, the inner peripheral edge thereof extending over and beyond the edge of the valve engaging the ledge, said ring being spaced from said valve so as not to be engaged thereby when it is flexed to establish a fluid flow through the valve-cage in said other direction.

5. A fluid flow mechanism in accordance with claim 3 in which however one of the disc-valves is provided with a constantly open fluid flow orifice, and is stiffer and of lesser flexibility than the adjacent disc-valve.

6. A fluid flow control mechanism consisting of a valve-cage having a plurality of fluid flow passages certain of which open into an annular recess in one end of the valve-cage; a spring loaded valve normally closing one of said passages and being operative to establish fluid flow in one direction; inner, annular ledges of different diameters and axially spaced inside the annular recess; disc-valves normally biased to engage the respective ledges, said valves being operative successively to establish fluid flow through the valve-cage in the other direction; a spacer ring between said disc-valves and retaining means on the valve-cage, said means being swaged over to provide a biasing force upon the adjacent disc-valve.

MEARICK FUNKHOUSER.
EDWIN F. ROSSMAN.

REFERENCES CITED

The following references are of record in the file of this patent:

UNITED STATES PATENTS

| Number | Name | Date |
|---|---|---|
| 1,273,698 | Wainwright | July 23, 1918 |
| 1,546,570 | Dennedy | July 21, 1925 |
| 1,659,815 | Halleck | Feb. 21, 1928 |
| 2,316,924 | Whisler | Apr. 20, 1943 |
| 2,346,275 | Read et al. | Apr. 11, 1944 |